C. E. SHELDON.
PADDED HORSESHOE.
APPLICATION FILED JULY 31, 1912.
1,100,030.
Patented June 16, 1914.
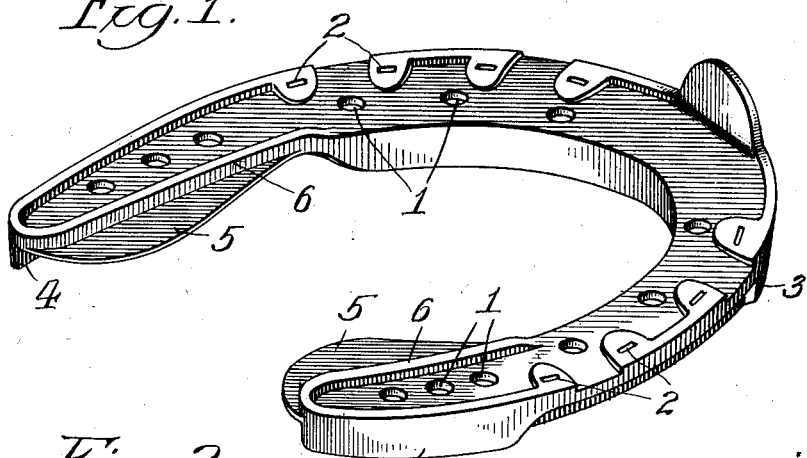
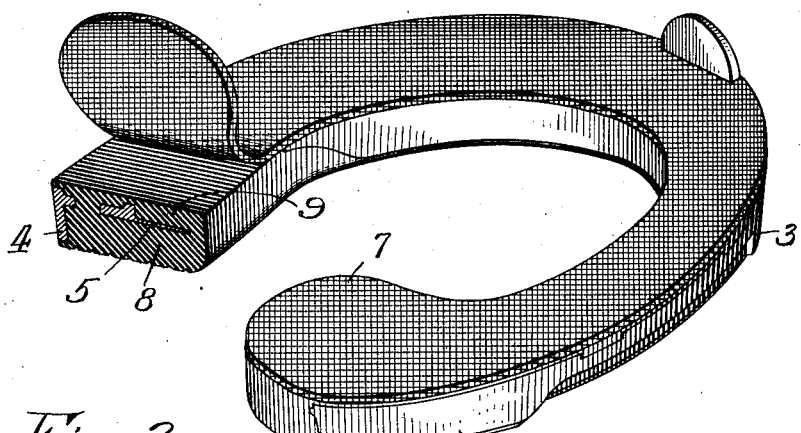
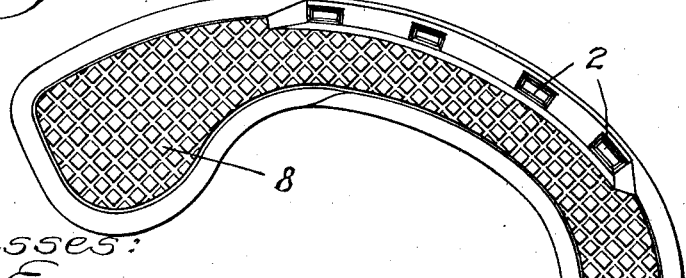
Witnesses:
John Enders
Paul W. Baumann
Inventor:
Charles E. Sheldon,
by Wallace R. Lane
Atty.

UNITED STATES PATENT OFFICE.

CHARLES E. SHELDON, OF AKRON, OHIO, ASSIGNOR TO THE WHITMAN & BARNES MANUFACTURING CO., OF AKRON, OHIO.

PADDED HORSESHOE.

1,100,030.  Specification of Letters Patent.  Patented June 16, 1914.

Application filed July 31, 1912. Serial No. 712,421.

*To all whom it may concern:*

Be it known that I, CHARLES E. SHELDON, a citizen of the United States, residing at Akron, county of Summit, and State of Ohio, have invented new and useful Improvements in Padded Horseshoes, of which the following is a specification.

It is the object of the present invention to provide a horseshoe with an elastic or cushioned tread, parts of the shoe being specially shaped to prevent slipping and to give reinforcement at the rear of the hoof while allowing ventilation of the frog, and being free from danger of injury to the foot of the animal.

The hoof of a horse in its natural unshod condition rests with the frog of the foot in contact with the ground, giving elasticity to the tread and relative freedom from slipping. The introduction of a metal shoe under the hoof lifts the frog from contact with the ground, increasing the danger of slipping and also relieving the frog from the pressure and wear to which it is subjected naturally when the horse is unshod.

According to the present invention, the hoof is reinforced by a metal shoe which resists wear, particularly at the front of the hoof where the impact against the pavement is greatest, while at the same time preserving the elasticity of tread which characterizes the unshod hoof, and particularly lifting and reinforcing the rear of the hoof with elastic material adequately secured and supported, this material being in position to press yieldingly against the bulb of the heel giving natural security to the tread of the horse and preserving the natural function of the frog as a wear resisting and pressure sustaining part of the foot. To secure these and other objects and advantages, the shoe is padded in a new way and is provided with integral metal wings extending inward and specially shaped to support and reinforce the elastic pads which contact with the hoof.

In the drawings forming a part of this specification, Figure 1 is a perspective view of the metal part of the shoe before the elastic material is applied, Fig. 2 is a perspective view of a complete shoe with one of the elastic pads cut through to expose the metal reinforcement and with a part of the canvas facing at the top of the shoe bent up to show the structure beneath, and Fig. 3 is a fragmentary view of the bottom of the complete shoe showing the shape and location of the elastic facing and of one of the inwardly extending pads.

The metal structure of Fig. 1, preferably of steel and capable of bending cold to fit exactly on a hoof is provided with recesses in its top and bottom faces for the reception of cushions of caoutchouc or other suitable elastic material. These recesses are connected by transverse holes 1 so that when the elastic material is put on, as by vulcanizing or the like, it will flow through these openings and unite the upper and lower layers, binding the entire padding into one firm and closely adhering structure. Nail holes 2 are provided for fastening the shoe to the hoof, and shoulders or abutments surround these holes, so that when the shoe is fastened to the hoof there will be no considerable thickness of elastic material between the two. Otherwise the elastic material might yield enough to permit motion of the shoe with respect to the hoof with resultant disadvantages.

At the front of the shoe on the underside is a downward projection 3 of substantial area, somewhat in the nature of a toe calk, and similar projections 4 at the heel of the shoe give strength and rigidity coupled with resistance to wear.

At the heel of the metal frame inwardly projecting wings 5 are provided, these being of metal integral with the frame and preferably relatively thin and resilient. As shown in Fig. 1, these wings are spaced somewhat below the top edge 6 of the frame, thereby admitting a substantial layer of rubber over the wing and between the wing and the hoof of the animal. This positioning of the wing is of relatively great importance in that it insures the desired cushioned pressure on the ball of the animal's foot without danger that the rubber cushion will be cut or sheared off while in service, and particularly without danger that any part of the metal frame could work lose or become detached and cut into the frog, or otherwise damage or cripple the animal's foot.

Fig. 2 illustrates in a general way the position and general form of the elastic covering for the metal frame. The inwardly extending pads 7 which envelop and project beyond the wings 5 are relatively thick and completely envelop the wings 5, as shown in the sectioned part of that figure, there being enough rubber below the wing at 8 to give a firm non-slipping grip on the pavement, and there being enough rubber above the wing at 9 to form a reliable cushion for the ball of the animal's foot. The wings 5 support and stiffen the pads, and by their own resiliency may add to the non-slipping character of the shoe, and they have the further function of protecting the rubber from the cutting or shearing action which otherwise might take place, giving the pads 7 strength and rigidity coupled with such elasticity as is necessary to effect the desired result. Free ventilation is possible and the hoof can be kept in healthy condition and strong and well developed throughout.

What I claim as new and desire to secure by Letters Patent of the United States is:

1. A horse shoe comprising a metal frame cushioned above and below with elastic material and inwardly projecting intermediate resilient wings formed integral with the heels of said shoe frame for supporting the covering or padding engaged by the frog of the animal's foot.

2. A horse shoe comprising a metal frame adapted to be cushioned above and below with elastic material and inwardly projecting intermediate resilient wings formed integral with the heels of said shoe frame for supporting the covering or padding engaged by the frog of the animal's foot.

In witness whereof, I hereunto subscribe my name to this specification in the presence of two witnesses.

CHARLES E. SHELDON.

Witnesses:
  Wm. H. Eager,
  W. E. Rowell.